Nov. 20, 1928. H. G. R. VULLIET ET AL Re. 17,139

SHEARS

Original Filed Nov. 2, 1922 3 Sheets-Sheet 1

INVENTORS
HUBERT G. R. VULLIET
FRANÇOIS A. H. DESCHÂTRES
BY
Lotka, Kellenberger & Mathi
ATTORNEYS

SHEARS

Original Filed Nov. 2, 1922 3 Sheets-Sheet 2

INVENTORS
HUBERT G. R. VULLIET
FRANÇOIS A. H. DESCHÂTRES
BY Lotka, Kehlenbeck & Mathi
ATTORNEYS

SHEARS

Original Filed Nov. 2, 1922 3 Sheets-Sheet 3

INVENTORS
HUBERT G.R. VULLIET
FRANÇOIS A.H. DESCHÂTRES
BY Lotka, Kellenbeck & Maché
ATTORNEYS Reissued Nov. 20, 1928. Re. 17,139

UNITED STATES PATENT OFFICE.

HUBERT GASTON RAPHAEL VULLIET AND FRANÇOIS ALEXIS HENRI DESCHÂTRES, OF PARIS, FRANCE, ASSIGNORS TO ANDRÉ GUENEAU, OF PARIS, FRANCE.

SHEARS.

Original No. 1,493,171, dated May 6, 1924, Serial No. 598,474, filed November 2, 1922. Application for reissue filed October 25, 1927. Serial No. 228,680.

In shears having a reciprocating movement, used up to this day, the relative feeding movement of the sheet-iron plate relatively to the shears is obtained either by means of a special device or by hand. The automatic feed, which moreover, is not generally used, necessitates a mechanical complication which is costly in every case, and quite inadmissible with small fixed or portable shears. Consequently, in the latter, the feeding is always effected by hand; it results therefrom that the workman utilizing a machine of this kind is troubled by two preoccupations: to cause the tool (or the sheet-iron plate) to move forward at every stroke according to a predetermined extent slightly less than the length cut, and to guide it for cutting according to the line traced. On the other hand, these shears can only cut according to a straight line and use must be made of non-portable circular shears for curved outlines.

The principal object of this invention is to provide a new and improved construction of great simplicity particularly adapted for small fixed or portable shears, (although not necessarily limited to small shears), by means of which straight cuts or cuts having curves of small radii or of irregular configuration may be quickly and accurately made with the same tool.

A further object is to provide a new shear in which, by a very simple mechanism, the blade itself can take a bearing on the sheet-iron plate (or acts on the same) for effecting the necessary feeding movement.

In the shears forming the subject-matter of the invention, the movable blade is obliquely secured on a blade-carrier directly mounted on the crank pin of a crank or of an eccentric to which is imparted a continuous circular movement and this blade-carrier is moreover shaped in such a manner as to side in or on a shaft parallel to the axis of the driving crank.

This particular mechanism imparts to the movable blade two simultaneous movements: 1. a reciprocating movement for moving it towards and away from the fixed blade, movement by which the cutting operation is effected; 2. a reciprocating movement in the direction of the advance and recoil of the tool. In this latter movement, the movable blade moves in the direction of the recoil during the cutting operation but owing to its obliquity and to its keenness it cannot slide on the sheet iron plate and, in consequence of the relative displacement of the blades, produces the advance of the tool or the plate according to whether the tool is portable or fixed.

According to a first form of construction, the movable blade-carrier mounted on the central bearing, which is out of center, of the driving shaft, is, on the other hand, extended on the side opposite to the blade, by a prismatic or cylindrical tail-piece which moves in a slide of a shaft arranged parallel and above the driving eccentric, so that the elliptical movement imparted to the movable blade is such that the small axis of the ellipse is directed in the same direction as the edge of the blade and that the movement of relative displacement of the tool and of the material to be cut is small.

In a second form of construction, this movable blade-carrier is so devised as to present a very large guide surface, in order to ensure the displacement of the movable blade, rigorously in the same plane.

Moreover, the rocking axis of this blade-carrier is arranged at a point situated slightly below the axis of rotation of the eccentric driving the blade-carrier, so that the elliptical movement of this latter is such that the large axis of the ellipse is directed in the same direction as the edge of the blade and that the movement of translation of the said blade is thus the maximum.

Finally, two curved slots are formed one above the other in the frame of the shears and symmetrically arranged relatively to the middle plane of the shears, and with their point of tangency slightly in front of the apex of the angle formed by the blades of the shears, so as to permit of turning the tool or work in both directions in very small radii and to obtain the cutting of curved outlines without distorting the material cut; these slots forming an oval opposed at the top to the cutting angle of the blades, so as to release the sheet-iron plate cut without distorting it.

In order that the invention may be clearly understood, two forms of construction forming the subject-matter of the said invention will be described hereafter, by way of example, with reference to the accompanying drawing in which.

Figure 11:
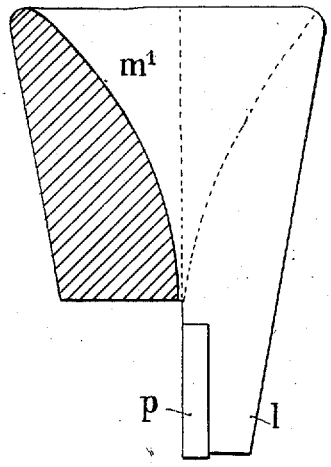
Figure 12:
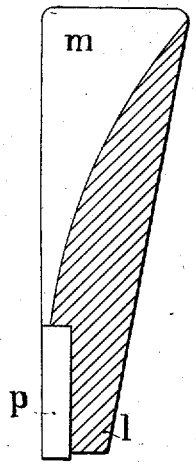
Figure 8:
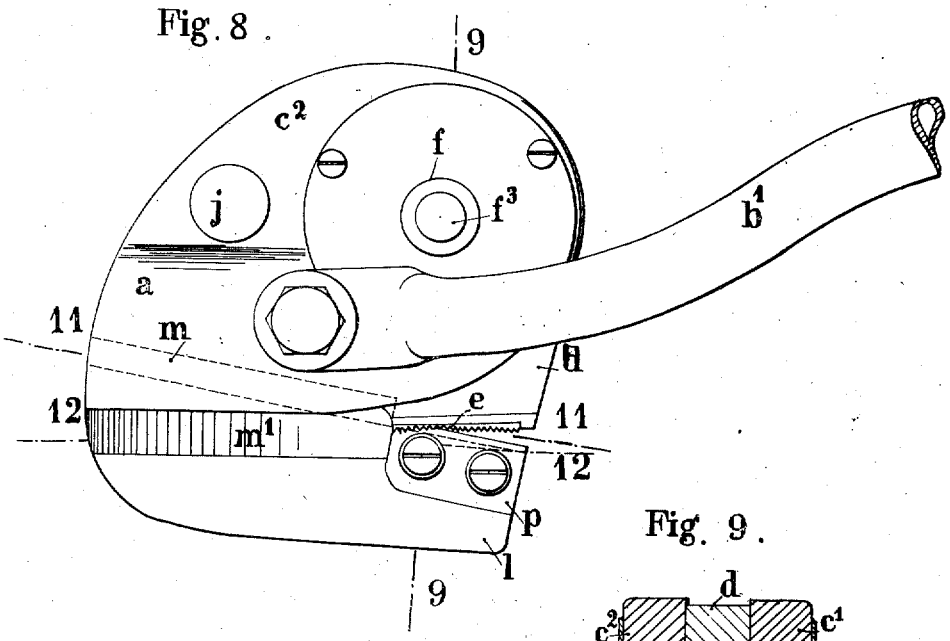
Fig. 8 is a side view thereof.
Figure 9:
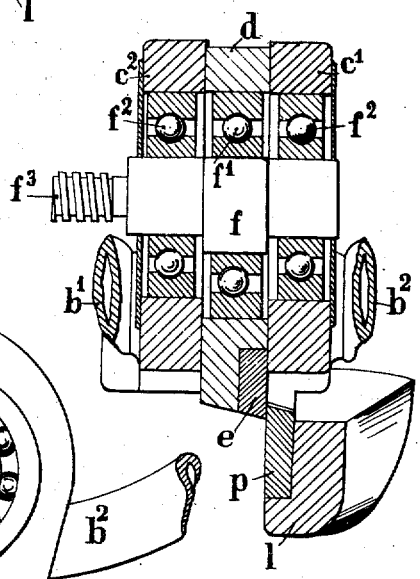
Fig. 9 is a cross vertical section made according to line 9—9 of Fig. 8.
Figure 10:
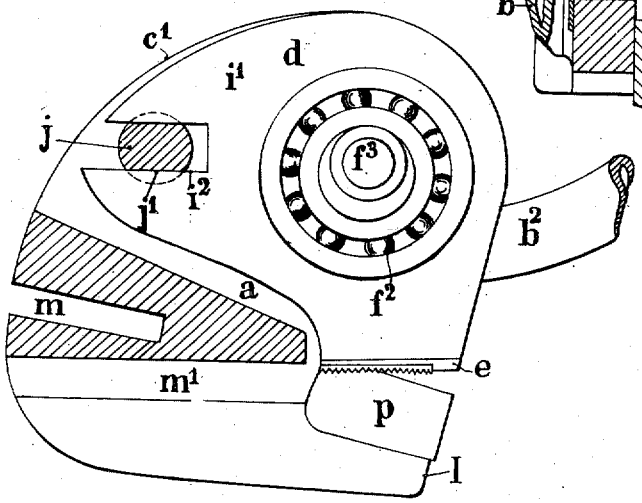
Fig. 10 is a longitudinal vertical section made according to line 10—10 of Fig. 7.

Figs. 11 and 12 are two horizontal sections made respectively according to lines 11—11 and 12—12 of Fig. 8.

Figure 6:
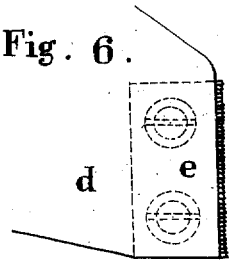
Fig. 6 is a view, on an enlarged scale, of the movable blade.
Figure 7:
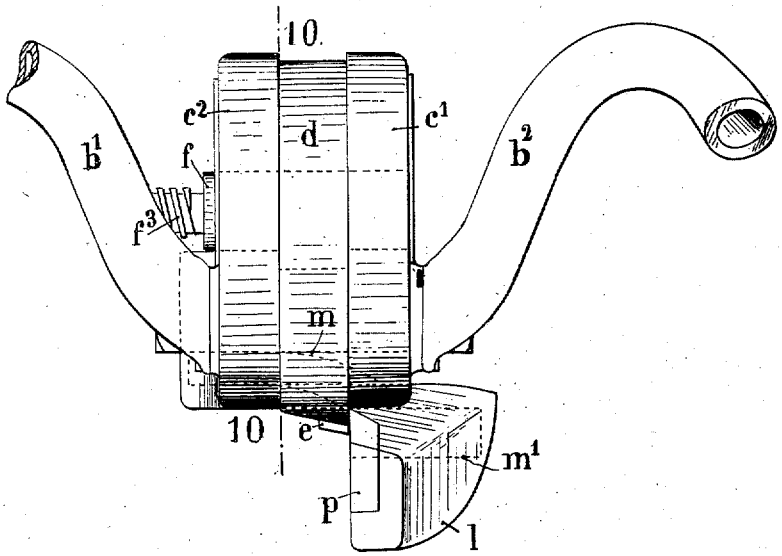
Fig. 7 is a front elevation of a modification.

As illustrated in the drawing, the shears forming the subject-matter of the invention comprise a frame $a$, which if the shears are constructed to be moved while the work is held fixed, is provided with two handles $b^1$ and $b^2$ for permitting the easy manipulation of the apparatus. The frame $a$ is also provided with two spaced cheeks $c^1$, $c^2$ the opposite faces of which are machined so as to guide the blade-carrier $d$ on which is obliquely secured the movable blade $e$. As shown in the drawing, Fig. 6, this blade may be provided with small teeth which are oblique in the direction of the feeding movement of the sheet-iron plate. These teeth are not indispensable, but facilitate the operation as will be explained hereafter.

The blade-carrier is mounted on a shaft $f$, the bearings of which in the cheeks $c^1$, $c^2$ are out of center relatively to the bearing in the blade-carrier $d$. The diameters of these bearings preferably decrease from right to left (Fig. 3), so as to permit the assemblage and disassemblage of the parts. A conical pin $g$ fitted in a groove $h$ provided in the shaft $f$, or any other suitable device, holds the latter in place. This shaft terminates in two squares or other bearings which permit the connection thereto of a suitable actuating means, such as a flexible transmission when the device is used as a portable tool, or an electric motor or other suitable driving means if the tool is mounted on a fixed support.

The blade-carrier $d$ terminates on the opposite side of the blade in a cylindrical tail-piece $i$ fitted in a corresponding hole formed in a shaft $j$, of large diameter, which can oscillate in bearings provided in the cheeks $c^1$ and $c^2$.

The frame $a$ terminates at the bottom in an incline $k$. It carries at this end a kind of hook $l$ separated from the cheek $c^1$ by a groove $m$.

On this hook is obliquely secured the fixed blade $n$. The incline $k$ and the slot $m$ both begin or start from the fixed blade $n$ and are substantially parallel to the blades $e$ and $n$ respectively, so that the two portions of the cut sheet-iron plate can be disengaged without being distorted.

Figure 1:
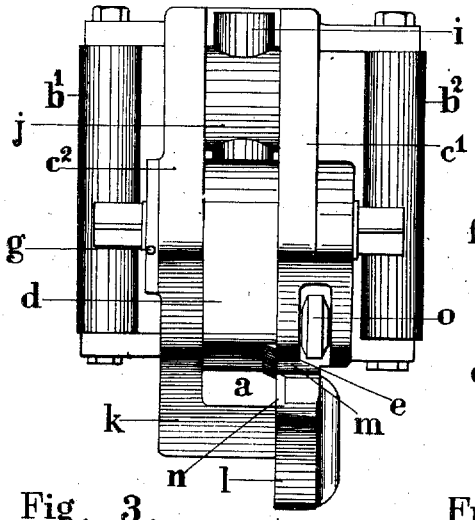
Fig. 1 is a front view.
Figure 2:
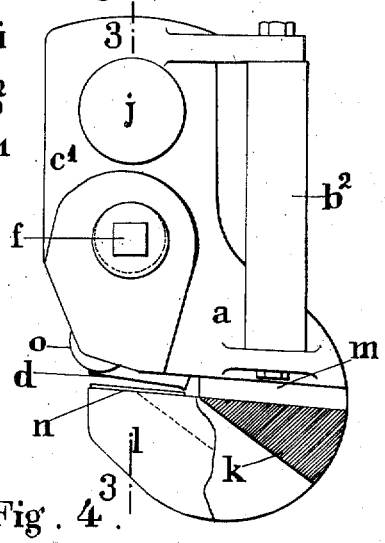
Fig. 2 is a side view, the frame being partially cut away.
Figure 3:
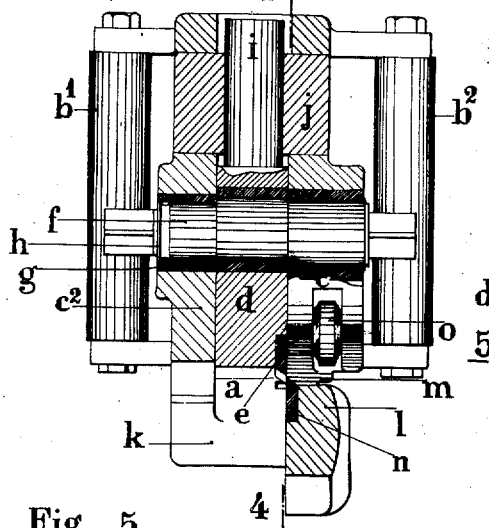
Fig. 3 is a section made according to line 3—3 of Fig. 2.
Figure 4:
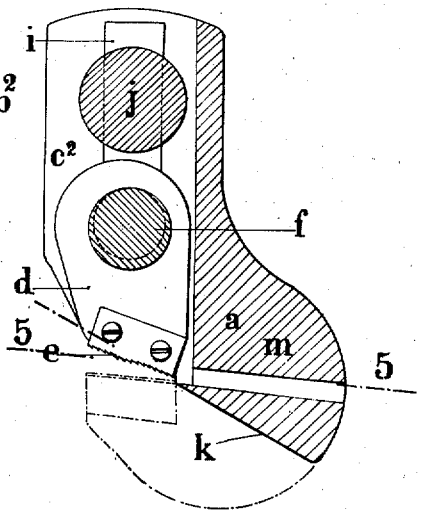
Fig. 4 is a section according to line 4—4 of Fig. 3.
Figure 5:
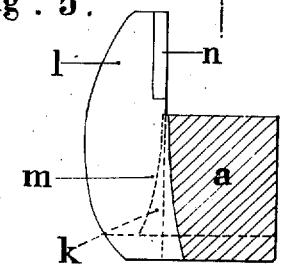
Fig. 5 is a sectional plan view according to line 5—5 of Fig. 4.

On the other hand, the bottom of the slot $m$ and the edge of the incline $k$ are similarly curved in opposite directions as shown in Figs. 3 and 5 in order to allow the cutting of curved outlines. A roller $o$ may be provided to act as a rotary bearing.

In the form of construction illustrated in Figs. 7 to 11, the shears comprises, as in the previous example, a frame $a$ which may be provided with two handles $b^1$, $b^2$ for grasping and guiding the apparatus. Said frame is provided with two cheeks $c^1$, $c^2$ machined on their inner face between which is guided the blade-carrier $d$ on which is obliquely secured the movable blade $e$.

This blade-carrier is formed of a flat steel member the dimensions and shape of which are approximately similar to those of the cheeks $c^1$, $c^2$ and the plane faces of which are perfectly machined so as to fit with a neat running fit between the opposed guiding surfaces of said cheeks and thereby ensure the guiding and displacement of the blade $e$ in the same plane.

In this form of the invention, the blade-carrier is mounted by means of a ball-bearing $f^1$ on the central bearing of a shaft $f$, which is out of centre relatively to the end bearings mounted in ball-bearings $f^2$ arranged in the cheeks $c^1$, $c^2$ of the frame.

The blade-carrier $d$ has formed at the rear thereof, an extension $i^1$ in which is provided a rectilinear slide-way $i^2$ which fits on the flat portion $j^1$ of a shaft $j$ capable of freely rocking in bearings formed in the cheeks $c^1$, $c^2$, at the rear of the shaft $f$ the rotation of which produces the displacement of the movable blade $e$.

The shaft $j$ which forms the axis of oscillation of the movable blade, is situated, at the rear and slightly below the axis of rotation of the driving shaft $f$, so that the elliptical movement of the movable blade is such that the large axis of the ellipse extends in the same direction as the edge of the blade whereby the movement of translation of the tool is the maximum.

At its lower part, the frame $a$ is provided with a kind of hook $l$ at the end of which is secured the fixed blade $n$ and which is separated from the cheek $c^1$ by a longitudinal slot $m$ below which is formed a second longitudinal slot $m^1$ open on the opposite face of the hook $l$ and the upper bottom of which is connected with the base of the cheek $c^2$.

The vertical wall of each of these slots is curved and these walls are, as shown respectively in Figs. 11 and 12, symmetrically arranged relatively to the cutting plane of the tool and have their point of tangency slightly in front of the apex of the angle formed by the two blades. By referring to Fig. 8 it will be noted that the slots $m$, $m^1$ are substantially parallel to the blades $e$ and $p$ respectively and begin or start from the fixed blade $p$, thus forming supporting surfaces for the cut portions of the sheet and preventing distortion thereof by the cutting action of the shears. As a result of this construction, relative movement between the tool and material in the plane of the latter is not prevented, as with the prior constructions, but the sheet, or tool as the case may be, can be freely turned about a vertical axis for the production of curved outlines. The curvature of the vertical walls of the slots as shown in Fig. 11 also aids in freeing the work because as these vertical walls recede or curve away from the plane of the vertical cutting edges of the blades there is a substantial clearance between such walls and the cut portions of the sheet.

The operation of the shears is the following:

The shaft $f$ being actuated with a rotary movement by means of a suitable transmission, such for instance, as a flexible transmission provided with an internally screw-threaded sleeve fitted on the suitably screw-threaded end $f^3$ of the said shaft $f$, this latter acting in the same way as a crank shaft, drives the movable blade $e$ parallel to itself with an approximately elliptical movement resulting, as above stated, from the two following simultaneous movements:

1. Vertical reciprocating movement during which the cutting operation is effected;

2. Reciprocating movement in the direction of advance and recoil of the tool determining the translation or feed of the shears on the material to be cut; the movable blade $e$ being displaced towards the right (Fig. 8) on the sheet-iron plate during the inoperative portion of its stroke. When however, the blade is performing the cutting portion of its stroke it is moving towards the left (Fig. 8) or towards the fixed blade, the pressure of the movable blade performing a gripping action on the plate, which is increased if the lower face of the movable blade is toothed, and thus causing the shears or material as the case may be, to advance.

It will be readily understood that with a shears constructed in accordance with the principles of our invention, the effective automatic feeding of the material is secured by a very simple mechanism. Therefore, the workman is not compelled, as with the usual devices, to exert great pressure for forcing the material to the tool or vice versa. Furthermore, the principles of our invention enable a power operated shears to be constructed which is capable of producing straight cuts, or oppositely curved outlines of very small radii, or any desired combination thereof without necessitating any change or adjustment of the tool. The cutting of curved outlines of small radii or of irregular configuration may be quickly and accurately performed by a shears constructed according to our invention because of the following principles of operation and construction, each of which contributes to secure the desired result; the automatic feeding of the material due to the combined horizontal and vertical reciprocation of the movable blades: the relatively short cutting blades and the small length of material cut at each stroke thereof; the prevention of distortion of the material by the construction and arrangement of the inclined supporting surfaces formed by the incline $k$ and slots $m$, $m^1$, and the curved vertical walls adjacent to such inclined supporting surface.

Finally, the forms of construction described with reference to the accompanying drawing are particularly strong and allow the manufacture of shears, of very reduced weight and volume capable of cutting relatively thick sheet-iron plates. The principles of our invention obviously are not limited to portable shears such as herein disclosed but are equally applicable to the manufacture of fixed shears, the material to be cut being then driven by the movable blade.

Finally, it is possible to manufacture, according to the principle of the invention, shears adapted to cut any sheet material other than sheet-iron (sheet metals, fibres, cardboard, leather, etc.) capable of being cut by the crossing of two blades.

The above arrangements are, of course, given by way of example only; the forms, proportions and dimensions may vary according to circumstances without departing from the principle of the invention.

Claims:

1. A shears for cutting sheet-iron plates and other materials comprising: a frame,—guide handles,—two parallel cheeks formed in the said frame,—a hook at the base of the frame,—a fixed blade of the shears, obliquely secured at the end of this hook,—a driving shaft journalled in the said cheeks, a central eccentric bearing on the said shaft and situated in the interval separating the said cheeks, a blade-carrier mounted on the central bearing of the driving shaft and receiving from the latter a reciprocating movement moving it towards and from the fixed blade,—a movable blade secured in an inclined position at the base of this blade-carrier,—means for imparting to this movable blade, simultaneously with the above reciprocating movement, a reciprocating movement in the direction of advance and recoil of the shears,—means permitting to turn the shears, during the cutting operation, on the material to be cut, in very small radii for cutting out curved outlines,—means for guiding and releasing the material cut without distorting the same.

2. A shears for cutting sheet-iron plates and other materials comprising: a frame, guide handles, two parallel cheeks formed in the said frame,—a hook at the base of the frame,—a fixed blade of the shears, obliquely secured at the end of this hook,—a driving shaft journalled in the said cheeks,—a central eccentric bearing on the said shaft and situated in the interval separating the said cheeks,—a blade-carrier mounted on the central bearing of the driving shaft and receiving from the latter a reciprocating movement moving it towards and from the fixed blade,—a movable blade secured in an inclined position at the base of this blade-carrier,—a second shaft, parallel to the driving shaft and rocking in the cheeks of the frame, an extension of the movable blade-carrier engaging with this second rocking shaft and sliding on the latter,—means permitting to turn the shears, during the cutting operation, on the material to be cut, in very small radii for cutting out curved outlines,—means for guiding and releasing the material cut without distorting the same.

3. A shears for cutting sheet-iron plates and other materials comprising: a frame, guide handles, two parallel cheeks formed in the said frame, a hook at the base of the frame, a fixed blade of the shears, obliquely secured at the end of this hook, a driving shaft journalled in the said cheeks, a central eccentric bearing on the said shaft and situated in the interval separating the said cheeks, a blade-carrier mounted on the central bearing of the driving shaft and receiving from the latter a reciprocating movement moving it towards and from the fixed blade, a movable blade secured in an inclined position at the base of this blade-carrier, a second shaft, parallel to the driving shaft and rocking in the cheeks of the frame, an extension of the movable blade-carrier engaging with this second rocking shaft and sliding on the latter, said frame being provided with two superposed grooves, a vertical wall, curved in the bottom of these grooves, the said vertical walls being symmetrically arranged relatively to the vertical middle plane of the shears, with point of tangency slightly in front of the apex of the angle formed by the two blades of the shears, means for guiding and releasing the material cut without distorting the same.

4. A shears for cutting sheet-iron plates and other materials comprising: a frame, guide handles, two parallel cheeks formed in the said frame, a hook at the base of the frame, a fixed blade of the shears, obliquely secured at the end of this hook, a driving shaft journalled in the said cheeks, a central eccentric bearing on the said shaft and situated in the interval separating the said cheeks, a blade-carrier mounted on the central bearing of the driving shaft and receiving from the latter a reciprocating movement moving it towards and from the fixed blade, a movable blade secured in an inclined position at the base of this blade-carrier, a second shaft, parallel to the driving shaft and rocking in the cheeks of the frame, an extension of the movable blade-carrier engaging with this second rocking shaft and imparting to the movable blade, simultaneously with the reciprocating movement moving it towards and from the fixed blade, a reciprocating movement of advance and recoil, said frame being provided with two superposed grooves, a vertical wall, curved in the bottom of these grooves, the said vertical walls being symmetrically arranged relatively to the vertical middle plane of the shears, with point of tangency slightly in front of the apex of the angle formed by the two blades of the shears, these two grooves permitting to turn the shears on the material to be cut for obtaining the cutting out of curved outlines, the said grooves forming together an angle opposed at the apex to the cutting angle of the blades for allowing to release the material cut and to avoid its distortion.

5. In a shears for cutting sheet material, a frame provided with a pair of oppositely inclined supporting surfaces for the cut portions of the sheet, a stationary blade secured to said frame, a movable blade, said frame being further provided with guideways for said movable blade, and driving mechanism connected with said movable blade for imparting thereto a movement towards and from said stationary blade during which any point of the cutting edge of said movable blade describes a substantially elliptical path.

6. In a shears for cutting sheet material, a pair of overlapping, cutting blades having their cutting edges forming an acute angle, one of said blades being fixed, means for giving the other blade a combined closing and drawing-in movement, and an acute-angled wedge located behind the cutting blades to separate the cut portions of the sheet material into different planes to permit relative turning of the blades and sheet material during the operation of the movable blade.

7. In a shears for cutting sheet material, a pair of cutting blades, one of which is movable relatively to the other, and driving mechanism for imparting to said one blade a movement towards and from the other during which any point of the cutting edge of said one blade describes a substantially elliptical path.

8. In a shears for cutting sheet material, a supporting framework, a pair of cutting blades, mounted on said framework in juxtaposed relationship with their cutting edges forming an acute angle, one of said blades being mounted for movement relatively to the other, driving mechanism connected with said movable blade for imparting thereto a movement towards and from the stationary blade during which any point of the cutting edge of said movable blade describes a combined horizontal and vertical reciprocation, and a pair of work supporting surfaces extending rearwardly from a point adjacent to the apex of the angle formed by the cutting edges of said blade, and substantially parallel with said cutting edges.

9. In a shears for cutting sheet material, a supporting framework, a pair of cutting blades, mounted on said framework in juxtaposed relationship with their cutting edges forming an acute angle, one of said blades being mounted for movement relatively to the other, driving mechanism connected with said movable blade for imparting thereto a movement towards and from the stationary blade during which any point of the cutting edge of said movable blade describes a combined horizontal and vertical reciprocation, a pair of work supporting surfaces extending rearwardly from a point adjacent to the apex of the angle formed by the cutting edges of said blade, and substantially parallel with said cutting edges, and a pair of oppositely curved diverging guiding surfaces adjacent to said work supporting surfaces, said guiding surfaces having their point of tangency adjacent to the apex of the angle of said cutting blades.

10. A shears for cutting sheet-iron plates and other materials, comprising: a frame,—two parallel cheeks formed in the said frame,—a hook on the frame,—a fixed blade of the shears obliquely secured at the end of this hook,—a driving shaft journalled in the said cheeks,—a central eccentric bearing on the said shaft and situated in the interval separating the said cheeks,—a blade-carrier mounted on the central bearing of the driving shaft and receiving from the latter a reciprocating movement moving it towards and from the fixed blade,—a movable blade secured in an inclined position at the end of this blade-carrier,—means for imparting to this movable blade, simultaneously with the above reciprocating movement, a reciprocating movement in the direction of the relative advance and recoil of the shears and the material to be cut,—means permitting relative turning of the shears and the material to be cut, during the cutting operation, in very small radii for cutting out curved outlines,—means for guiding and releasing the material cut without distorting the same.

11. A shears for cutting sheet-iron plates and other materials, comprising: a frame,—two parallel cheeks formed in the said frame,—a hook on the frame,—a fixed blade of the shears, obliquely securted to this hook,—a driving shaft journalled in the frame, an eccentric bearing on the said shaft and situated in the interval separating the said cheeks,—a blade-carrier connected to the eccentric bearing of the driving shaft and receiving from the latter a reciprocating movement moving it towards and from the fixed blade,—a movable blade secured to this blade-carrier in an inclined position,—means for imparting to this movable blade, simultaneously with the above reciprocating movement, a reciprocating movement in the direction of the relative advance and recoil of the shears and the material to be cut,—means permitting relative turning of the shears and the material to be cut, during the cutting operation, in very small radii for cutting out curved outlines,—means for guiding and releasing the material cut without distorting the same.

12. A shears for cutting sheet-iron plates and other materials, comprising: a frame,—two parallel cheeks formed in the said frame,—a fixed blade of the shears secured to the frame,—a driving shaft journalled in the said frame,—an eccentric bearing on the said shaft and situated in the interval separating the said cheeks,—a blade-carrier connected to the eccentric bearing of the driving shaft and receiving from the latter a reciprocating movement moving it towards and from the fixed blade,—a movable blade secured to this blade-carrier having a cutting edge intersecting the cutting edge of the fixed blade at an acute angle,—means for imparting to the cutting edge of this movable blade, simultaneously with its movement toward the fixed blade, a longitudinal movement towards the apex of said angle,—the frame being formed to permit the introduction of the material to be cut between the fixed and movable blades.

13. In a shears, a frame providing opposed parallel cheeks, a fixed shear blade mounted on said frame with its cutting edge beyond the periphery of said cheeks, a blade carrying plate located between said cheeks and guided thereby, a movable blade mounted on said carrying plate, and overlapping said fixed blade with its cutting edge at an acute angle to the cutting edge thereof, means for oscillating said blade carrying plate so as to cause an intermediate part only of the cutting edge of said movable blade to cross and re-cross the cutting edge of said fixed blade, and means engaging the blade carrier for guiding the oscillation of the movable blade in such direction that it has a component parallel to its cutting edge as well as a component perpendicular thereto.

14. In a shears for cutting sheet material, the combination of a frame providing two parallel cheeks, a fixed blade mounted on said frame, a blade carrying plate located between the cheeks of the frame and guided thereby, a cutting blade secured to said carrying plate and in overlapping relation with said fixed blade, means for oscillating said carrying plate engaging the plate at a point spaced from said blade along a line substantially perpendicular to and intersecting the edge of the blade, and a pivot fixed in said frame, engaging said plate and spaced from said blade along a line making an acute angle with and intersecting the edge of the blade.

15. An automatic shears for cutting sheet metal, comprising a pair of fixed and movable overlapping, cutting blades having their cutting edges forming an acute angle, a carrier for the movable blade, means for giving to said carrier a reciprocatory movement of such small amplitude as to cause only a short intermediate part of the cutting edge of the movable blade to cross and recross the cutting edge of the fixed blade, and a rigid frame formed to provide a guideway embracing the carrier of the movable blade and a rigid support for the fixed blade and to provide guiding means with clearance space extending rearwardly and outwardly from the apex of the angle formed by the cutting edges of the blades to permit relative turning of the blades and the sheet metal during the operation of the movable blade.

16. In a shears for cutting sheet material, a pair of cutting blades, one of which is movable relatively to the other, and driving mechanism for imparting to said one blade a movement towards and from the other during which any point of the cutting edge of said one blade describes an elongated curved closed path.

The foregoing specification of our "shears" signed by us this 29th day of July, 1925, and this 3rd day of May, 1927.

FRANÇOIS ALEXIS HENRI DESCHÂTRES.
HUBERT GASTON RAPHAEL VULLIET.